(12) United States Patent
Kristian et al.

(10) Patent No.: US 11,827,548 B2
(45) Date of Patent: *Nov. 28, 2023

(54) HYDROTHERMIC LIQUEFACTION OUTPUTS AND FRACTIONS THEREOF

(71) Applicant: Nulife Greentech Inc., Saskatoon (CA)

(72) Inventors: Jerry Kristian, Saskatoon (CA); Brock Eidem, Saskatoon (CA); Peter Voldeng, Saskatoon (CA)

(73) Assignee: NULIFE GREENTECH INC., Saskatoon (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/074,062

(22) Filed: Dec. 2, 2022

(65) Prior Publication Data

US 2023/0095921 A1 Mar. 30, 2023

Related U.S. Application Data

(63) Continuation of application No. 16/979,639, filed as application No. PCT/CA2019/050313 on Mar. 13, 2019, now Pat. No. 11,518,702.

(30) Foreign Application Priority Data

Mar. 13, 2018 (CA) .................................. CA 2998025

(51) Int. Cl.
*C02F 11/18* (2006.01)
*C01B 32/50* (2017.01)
(Continued)

(52) U.S. Cl.
CPC .............. *C02F 11/18* (2013.01); *B01D 3/143* (2013.01); *B01D 3/42* (2013.01); *C01B 32/50* (2017.08);
(Continued)

(58) Field of Classification Search
CPC . C02F 1/20; C02F 11/18; C01B 25/26; C01B 32/50; C01B 33/126; B01D 3/143;
(Continued)

(56) References Cited

U.S. PATENT DOCUMENTS

2013/0036660 A1    2/2013   Woods et al.

FOREIGN PATENT DOCUMENTS

CN         101805629 A      8/2010

OTHER PUBLICATIONS

Elliott, Douglas C. et al., "Hydrothermal liquefaction of biomass: Developments from batch to continuous process", Bioresource Technology, 178 (2015), pp. 147-156.
(Continued)

*Primary Examiner* — Brian A McCaig
(74) *Attorney, Agent, or Firm* — Suiter Swantz pc llo

(57) ABSTRACT

Commercially beneficial carbon-containing fractions can be recovered from hydrothermal liquefaction reactions in various types of processors. Feedstock slurry from waste solids is placed into a pressurized processor where it is maintained at temperature and pressure for a predetermined period. On discharge from the processor the processed discharge is separated into liquid and solid fractions. Gaseous fractions including carbon dioxide can also be removed or off-taken from the processor. New molecular structures are created in this reaction, resulting in fractions including biogas, biofuels, biosolids and biocrude. Silica, phosphates, potash and low concentration nitrogen based fertilizer, along with carbonaceous material can also be recovered.

12 Claims, 6 Drawing Sheets

(51) Int. Cl.
- *B01D 3/14* (2006.01)
- *B01D 3/42* (2006.01)
- *C01B 33/12* (2006.01)
- *C10L 9/08* (2006.01)
- *C10G 1/00* (2006.01)
- C10G 1/02 (2006.01)
- C01B 25/26 (2006.01)
- C10G 7/04 (2006.01)

(52) U.S. Cl.
CPC .......... *C01B 33/126* (2013.01); *C10G 1/006* (2013.01); *C10L 9/086* (2013.01); *B01D 2257/504* (2013.01); *B01D 2257/55* (2013.01); *B01D 2258/02* (2013.01); *C01B 25/26* (2013.01); *C10G 1/02* (2013.01); *C10G 7/04* (2013.01); *C10G 2300/1003* (2013.01)

(58) Field of Classification Search
CPC .......... B01D 3/42; B01D 2257/504; B01D 2257/55; B01D 2258/02; C10G 1/006; C10G 1/02; C10G 7/04; C10G 2300/1003; C10L 9/086
See application file for complete search history.

(56) References Cited

OTHER PUBLICATIONS

Fogler, H.S. (1992) Elements of Chemical Reaction Engineering, 2nd ed., Prentice Hall, 838 pp [Office action cites pp. 37-38].

Gollakota, A.R.K. et al., "Corrigendum to A Review on Hydrothermal Liquefaction of Biomass", Elsevier, Renewable and Sustainable Energy Reviews 98(2018), pp. 515-517.

International Search Report dated Aug. 15, 2019 for PCT/CA2019/050313.

HYDROTHERMIC LIQUEFACTION OUTPUTS AND FRACTIONS THEREOF

CROSS-REFERENCE AND RELATED APPLICATIONS

This Continuation application claims the benefit of priority of U.S. application Ser. No. 16/979,639 filed Sep. 10, 2020, and issued Dec. 6, 2022 as U.S. Pat. No. 11,518,702, which application is a 371 U.S. National Stage entry of PCT/CA2019/050313 filed Mar. 13, 2019 claiming the benefit of priority of Canadian Application No. 2998025 filed Mar. 13, 2018, the entirety of each of which is incorporated herein by reference.

FIELD OF THE INVENTION

The invention is in the field of waste treatment and hydrocarbon production, and more specifically comprises a method of extraction of various phase carbon-containing fractions from carbonaceous waste feedstock using a pressurized heat transfer process followed by fractionation of the treated processed discharge. Liquid, aqueous, solid and gaseous fractions are recovered.

BACKGROUND OF THE INVENTION

Traditional extractive hydrocarbon production techniques are threatened in many jurisdictions, as demand increases, and oil production geologies and areas are depleted, or the extraction of oil is socially complicated by climate change efforts and the like. While oil and gas extraction technologies will continue to remain important sources of hydrocarbons including liquid oil, this business environment has led to opportunities and awareness for trying new and alternative methods of producing or recovering hydrocarbon energy sources from other non-traditional techniques or sources. There are massive quantities of carbonaceous waste in the world from which it would be desirable to recover any available carbon-containing fractions. It is the goal of the present invention to develop a means of streamlined and economic extraction of various carbon-containing fractions from municipal solid waste and similar waste streams containing carbon.

Many of the prior art methods for recovery of oil from carbonaceous waste feedstocks rely in part on a heat treatment step. Heat transfer and recovery in the most efficient way possible is a primary economic viability factor in considering the adoption of many of these methods. In addition to efficiency and size of a heat transfer vessel, the economics of current recovery methods are also limited by virtue of the physical footprint of the required treatment equipment. Equipment of sufficient size to treat large volumes of carbonaceous waste feedstock is very large, limiting the attraction of its use. A method of extraction of a liquid carbon-containing fraction from carbonaceous waste feedstock which was efficient enough to process large volumes of carbonaceous waste feedstock efficiently, while protecting the environment by using as little fresh water as possible, is believed would be commercially accepted as a significant advance in waste treatment and hydrocarbon recovery techniques.

SUMMARY OF THE INVENTION

The present invention comprises a novel method of extraction of carbon-containing fractions of various states from carbonaceous waste feedstock. The fractions which can be recovered include liquid hydrocarbon or liquid carbon-containing fractions, other aqueous components, gaseous fractions which contain carbon dioxide, and solid fractions which might include silica, hydrochar or other solid components.

A hydrothermal liquefaction reaction is used to achieve the results of the present invention. Many different types of processors and tube reactors could be used, to use a hydrothermal liquefaction method and system to process waste streams including municipal solid waste, contaminated recycling waste, diverted organics, biosolids, agricultural residues or forestry residues, processed within parameters to yield various carbonaceous fractions.

In a first embodiment of the invention, it comprises a method of extraction of at least one carbon-containing fraction from carbonaceous waste feedstock, the method itself comprising a first slurry in step, creating a feedstock slurry by combining prepared feedstock with the slurry fluid is required to yield a feedstock slurry of the desired consistency and moisture content. Where solid or dry carbonaceous waste feedstock were used at the beginning of the method, it may be required to grind or otherwise process that feedstock into the prepared feedstock of a desired particle size or format for combination with the slurry fluid. In other cases, the carbonaceous waste feedstock itself might be liquid or of a sufficiently liquid form to require little or no slurry fluid in combination to yield a feedstock slurry of the desired consistency and moisture content.

Following creation of the feedstock slurry, heating step would be conducted in which the feedstock slurry will be placed into a processor, being a hydrothermic liquefaction reactor vessel, and he would to a selected temperature for a selected period heating time while maintaining a selected pressure within the processor. Following the completion of the heating time at these temperature and pressure parameters, the feedstock slurry is processed discharge which is discharged from the processor.

Processed discharge which is discharged from the processor is next subjected to a fractionation step in which the processed discharge is separated into four fractions, namely a liquid carbon-containing fraction, liquid effluent fraction, a gaseous fraction and a solid fraction. The gaseous fraction contains carbon dioxide. In some embodiments it may be desirable to recover or separate the carbon dioxide from the remainder of any components in the gaseous fraction for commercial use, or in other embodiments rather than commercial use for the carbon dioxide to be recovered it might be stored or sequestered. All such approaches are contemplated within the scope of the present invention.

The liquid effluent fraction which is separated from the remainder of the liquid in the processed discharge is primarily water, since the initial feedstock slurry uses water as a slurry fluid and the slurry fluid/liquid effluent fraction is reused, to minimize the amount of clean water used in the process of the present invention.

In some embodiments of the method of the present invention, dependent upon the feedstock used, solid fraction recovered in the fractionation step might contain silica and following the fractionation step the silica could be separated from the recovered solid fraction for commercial use. In other embodiments, again to a degree dependent in volume or success upon the nature of the carbonaceous waste feedstock used, solid fraction recovered in the fractionation step might contain hydrochar which could be separated from the solid fraction for commercial use following the fractionation step.

As outlined above, carbon dioxide could be separated from the gaseous fraction for commercial use. There might also be off gassing of carbon dioxide and other gases from the processor during the hydrothermal liquefaction reaction, and these off gases can also be captured and processed along with the remainder of the gaseous fraction in the fractionation step.

The liquid carbon-containing fraction which is gathered or collected at the fractionation step in the broadest embodiments of the method might include at least one aqueous chemical which could also be extracted from the liquid carbon-containing fraction in an aqueous extraction step following the fractionation step. Those aqueous chemicals could be selected from the group of: Furan, 2,5-dimethyl; Phenol; 1,3 Butadiene; 2,4-hexadiene; 1H-pyrazole, 1,3,5 trimethyl; Phenol,4-methyl; Ethanone; Benzeneacetic acid, 4-hydro-3-methoxy; Decane; Undecanoic acid (fatty acids); 2-propenol; 1-Naphthalenone; Tridecane; Tetradecane; Heneicosane; n-Hexadecanoic acid; Heptadecane; Ricinoleic acid; octadecane; Octadecanoic acid, methyl ester; 9-octadecenoic acid, methyl ester; Eicosane; Retinal,9-cis; Retinol; Tetracosane; or Hexanedioic acid, ester.

A specific set of process parameters are believed to be the most ideal of the execution of the hydrothermic liquefaction reaction of the present invention. Specifically, the selected pressure within the processor during the heating step is likely in the range of 2000 psi to 4000 psi, the slurry should likely be in excess of 50% moisture, and the selected temperature is in the range of 275° C. to 425° C. It is believed that the most desirable range of heating times will be the range of five minutes to 120 minutes for a batch of feedstock slurry being processed within the processor. It will be understood that in their broadest sense the method of the present invention could be practiced using parameters outside of these ranges without necessarily departing from the scope of the method outlined herein.

In certain embodiments of the method of the present invention a preprocessing step might be used in advance of the slurring step, wherein the carbonaceous waste feedstock will be prepared for being subjected to the remainder of the steps of the method—the preprocessing step would likely comprise removing untreatable items from the carbonaceous waste feedstock such as metal, rocks, glass or other non-treatable waste. Depending upon the remainder of the method these or other items may be most desirably removed from the carbonaceous waste feedstock in advance of comminution or slurrying, while in other embodiments of the method it may not be necessary. The preprocessing step may also include the addition of other ingredients such as reactor catalyst components of the like that will enhance the performance of the hydrothermic liquefaction reaction.

Various types of processor or reactor units could be used in the reaction of the present invention—one type of the process which could be used would be a tube reactor with an intake in the discharge, and heating fluid Around at least a portion thereof to keep the contents of the tube reactor, wherein the heating fluid circulated therethrough would transfer heat to the tube reactor and to the feedstock slurry within the processor without burning the contents thereof. It will be understood however to those skilled in the art that there are any number of additional processor designs which could be used to achieve the reaction of the present invention and any such additional reactor designs are contemplated within the scope of the present invention.

The method of the present invention, while being effective with many different types of processors and tube reactors, could be accomplished using a processor with a "out and back" design, which comprises an outer heating tube having an outer tube length and an outer tube diameter, and a closed outer distal end of the discharge end with an inner heating tube with an inner tube length and an inner tube diameter with an injection end and an open inner distal end. The inner volume of the inner feeding tube would comprise an inner heating reservoir. The inner tube diameter is smaller than the outer tube diameter, so when the inner heating tube is placed within the outer heating tube, the space between the inner heating tube and the outer heating tube is an outer heating reservoir, and the inner heating tube is mounted axially inside of the outer heating tube with the injection end of the inner feeding tube being in proximity to the discharge end of the outer heating tube, and the inner distal end of the inner heating tube is in proximity to the inside of the outer distal end of the outer heating tube. This configuration of the inner heating tube and the outer heating tube results in the "out and back" slurry path design, where slurry pumped into the inner heating tube will travel through the inner heating tube and then back through the outer heating reservoir when discharged from the inner distal end of the inner heating tube.

To yield the novel fractions and outputs outlined, the materials are anticipated to be processed at moisture levels over 50%, of pressures between 2000 to 4000 psi, and temperatures between 250 to 450° C. Processing these waste streams in a slurry within these process parameters will break down the waste materials and create new molecular structures, yielding biogas, biofuels, biosolids, biocrude, and hydrocarbons. Carbon dioxide can be recovered from the process which could be used for industrial, food or other applications, even extending as far as enhanced oil recovery in underground hydrocarbon recovery etc. The solid portions recovered from the process include silica, phosphates, potash, and even low concentration of nitrogen fertilizer. Carbon and activated carbon will also be recovered.

The output fractions of the method include the following beneficial chemical compounds:

| Name | Chemical formula |
| --- | --- |
| Furan, 2,5-dimethyl | $C_6H_8O$ |
| Phenol | $C_6H_6O$ |
| 1,3 Butadiene or 2,4-hexadiene | $C_6H_{10}$ |
| 1H-pyrazole, 1,3,5 trimethyl | $C_6H_{10}N_2$ |
| Phenol, 4-methyl | $C_7H_8O$ |
| Ethanone | $C_8H_{12}O$ |
| Benzeneacetic acid, 4-hydro-3-methoxy | $C_9H_{10}O_4$ |
| Decane | $C_{10}H_{22}$ |
| Undecanoic acid (fatty acids) | $C_{11}H_{20}O_2$ |
| 2-propenol | $C_{11}H_{13}NO$ |
| 1-Naphthalenone or | $C_{12}H_{14}O$ |
| Tridecane | $C_{13}H_{28}$ |
| Tetradecane | $C_{14}H_{30}$ |
| Heneicosane | $C_{15}H_{32}$ |
| n-Hexadecanoic acid | $C_{16}H_{32}O_2$ |
| Heptadecane | $C_{17}H_{36}$ |
| Ricinoleic acid | $C_{18}H_{34}O_3$ |
| octadecane | $C_{18}H_{38}$ |
| Octadecanoic acid, methyl ester | $C_{18}H_{38}O_2$ |
| 9-octadecenoic acid, methyl ester | $C_{19}H_{36}O_2$ |
| Eicosane | $C_{20}H_{42}$ |
| Retinal,9-cis | $C_{20}H_{28}O$ |
| Retinol | $C_{20}H_{30}O$ |
| Tetracosane | $C_{21}H_{44}$ |
| Hexanedioic acid, ester | $C_{22}H_{42}O_4$ |

These potential fractions or products as outputs of the process and waste streams treated within these parameters outlined are explicitly contemplated to be within the scope of the present invention.

In addition to the general method disclosed herein there is also disclosed another embodiment of the present invention comprises a method of extraction carbon dioxide from carbonaceous waste feedstock. That method comprises, like the overarching method outlined above, a first slurrying stack in which feedstock slurry is created by combining prepared feedstock with the slurry fluid as required to yield a feedstock slurry of the desired consistency and moisture content. Following the slurrying step, in a heating step feedstock slurry is placed into a processor and heated to a selected temperature for a selected period heating time, while maintaining a selected pressure within the processor. Following completion of the heating time, the discharged slurry is processed discharge which is discharged from the processor.

The processed discharge is fractionated in a fractionation step, separating the processed discharge into at least three fractions being a liquid carbon containing fraction, a gaseous fraction containing carbon dioxide, and solid fraction. Following the fractionation step, in the separation step the carbon dioxide is separated from the remainder of the gaseous fraction for commercial use.

Like the general method outlined above, the carbonaceous waste feedstock might be subjected to a grinding step in advance of the slurrying step if it is solid or requires grinding to be converted to a prepared feedstock at the desired a selected particle size. In other embodiments, where the carbonaceous waste feedstock is already liquid or in excess of 50% moisture, it may not need to be combined with any slurry fluid in advance of subjective to the remainder of the method.

Similar process parameters would apply to this embodiment of the method—the selected pressure would be in the range of 2000 psi to 4000 psi, and the selected processing temperature would be in the range of 275° C. to 425° C. The method can be conducted with the heating step being done in a batch or continuous feeding mode in the processor, with an appropriate equipment design.

The present invention also specifically discloses a method of extraction of silica solids from carbonaceous waste feedstock. That method comprises, like the overarching method outlined above, a first slurrying stack in which feedstock slurry is created by combining prepared feedstock with the slurry fluid as required to yield a feedstock slurry of the desired consistency and moisture content. Following the slurrying step, in a heating step feedstock slurry is placed into a processor and heated to a selected temperature for a selected period heating time, while maintaining a selected pressure within the processor. Following completion of the heating time, the discharged slurry is processed discharge which is discharged from the processor.

The processed discharge is fractionated in a fractionation step, separating the processed discharge into at least three fractions being a liquid carbon containing fraction, a gaseous fraction containing carbon dioxide, and solid fraction containing silica solids. Following the fractionation step, in the separation step the silica solids are separated from the remainder of the solid fraction for commercial use. Like the general method outlined above, the carbonaceous waste feedstock might be subjected to a grinding step in advance of the slurrying step if it is solid or requires grinding to be converted to a prepared feedstock at the desired a selected particle size. In other embodiments, where the carbonaceous waste feedstock is already liquid or in excess of 50% moisture, it may not need to be combined with any slurry fluid in advance of subjective to the remainder of the method. Similar process parameters would apply to this embodiment of the method—the selected pressure would be in the range of 2000 psi to 4000 psi, and the selected processing temperature would be in the range of 275° C. to 425° C. The method can be conducted with the heating step being done in a batch or continuous feeding mode in the processor, with an appropriate equipment design.

The present invention also specifically discloses a method of extraction of hydrochar from carbonaceous waste feedstock. That method comprises, like the overarching method outlined above, a first slurrying stack in which feedstock slurry is created by combining prepared feedstock with the slurry fluid as required to yield a feedstock slurry of the desired consistency and moisture content. Following the slurrying step, in a heating step feedstock slurry is placed into a processor and heated to a selected temperature for a selected period heating time, while maintaining a selected pressure within the processor. Following completion of the heating time, the discharged slurry is processed discharge which is discharged from the processor.

The processed discharge is fractionated in a fractionation step, separating the processed discharge into at least three fractions being a liquid carbon containing fraction, a gaseous fraction containing carbon dioxide, and solid fraction containing hydrochar. Following the fractionation step, in the separation step the hydrochar solids are separated from the remainder of the solid fraction for commercial use. Like the general method outlined above, the carbonaceous waste feedstock might be subjected to a grinding step in advance of the slurrying step if it is solid or requires grinding to be converted to a prepared feedstock at the desired a selected particle size. In other embodiments, where the carbonaceous waste feedstock is already liquid or in excess of 50% moisture, it may not need to be combined with any slurry fluid in advance of subjective to the remainder of the method. Similar process parameters would apply to this embodiment of the method—the selected pressure would be in the range of 2000 psi to 4000 psi, and the selected processing temperature would be in the range of 275° C. to 425° C. The method can be conducted with the heating step being done in a batch or continuous feeding mode in the processor, with an appropriate equipment design.

BRIEF DESCRIPTION OF THE DRAWINGS

To easily identify the discussion of any element or act, the most significant digit or digits in a reference number refer to the figure number in which that element is first introduced.

DETAILED DESCRIPTION OF ILLUSTRATED EMBODIMENTS

As outlined above the general focus of the present invention is to provide a novel method of extraction of beneficial carbonaceous fractions from carbonaceous waste feedstock such as municipal solid waste. Processing of such a waste feed stream in a slurry comprising particulate or ground carbonaceous waste feedstock and recycled liquid effluent fraction from the process minimizes the need for clean water in processing. Various gaseous, liquid and solid compounds are obtained, which are beneficial and as products of this process are envisioned to be explicitly within the scope of the invention outlined. Virtually any material which contains carbon is contemplated to comprise a carbonaceous waste feedstock as outlined elsewhere herein. Any waste feedstock that contains a hydrocarbon portion which can be liberated and recovered under the method of the present invention is contemplated within the scope hereof.

The carbonaceous waste feedstock in its original format may have varying phases or varying liquid content which results in a modified approach being taken during the grinding step when the carbonaceous waste feedstock is ground into the ground feedstock of a particular particle size. Liquid carbonaceous waste feedstock could just as easily be processed under the method of the present invention, in which case slurry fluid may not to be added to create a flowable slurry, or hard or solid carbonaceous waste feedstock can also be used which could be ground into the appropriate particle size by grinding equipment and then comminuted or blended with a slurry fluid to produce the slurry of an appropriate flowable consistency in moisture content. Liquid or solid wastes are all contemplated to be within the scope of the present invention.

Overall the method of the present invention consists of the creation of a feedstock slurry, by combining carbonaceous waste feedstock with slurry fluid as required to yield a feedstock slurry of a desired moisture content and consistency. The feedstock slurry is then placed within a pressurized processor, where it is subjected to a heating reaction for a predetermined period and at a predetermined pressure level within the processor to a particular heated temperature. Following the elapse of the selected time within which the heating step is undertaken, transformation will have taken place within the feedstock slurry, which is now processed discharge, so numerous fractions are capable of segregation or fractionation therefrom—being a liquid fraction, a recovered solid fraction, and a gaseous fraction. The gaseous fraction will contain carbon dioxide.

Figure 1:
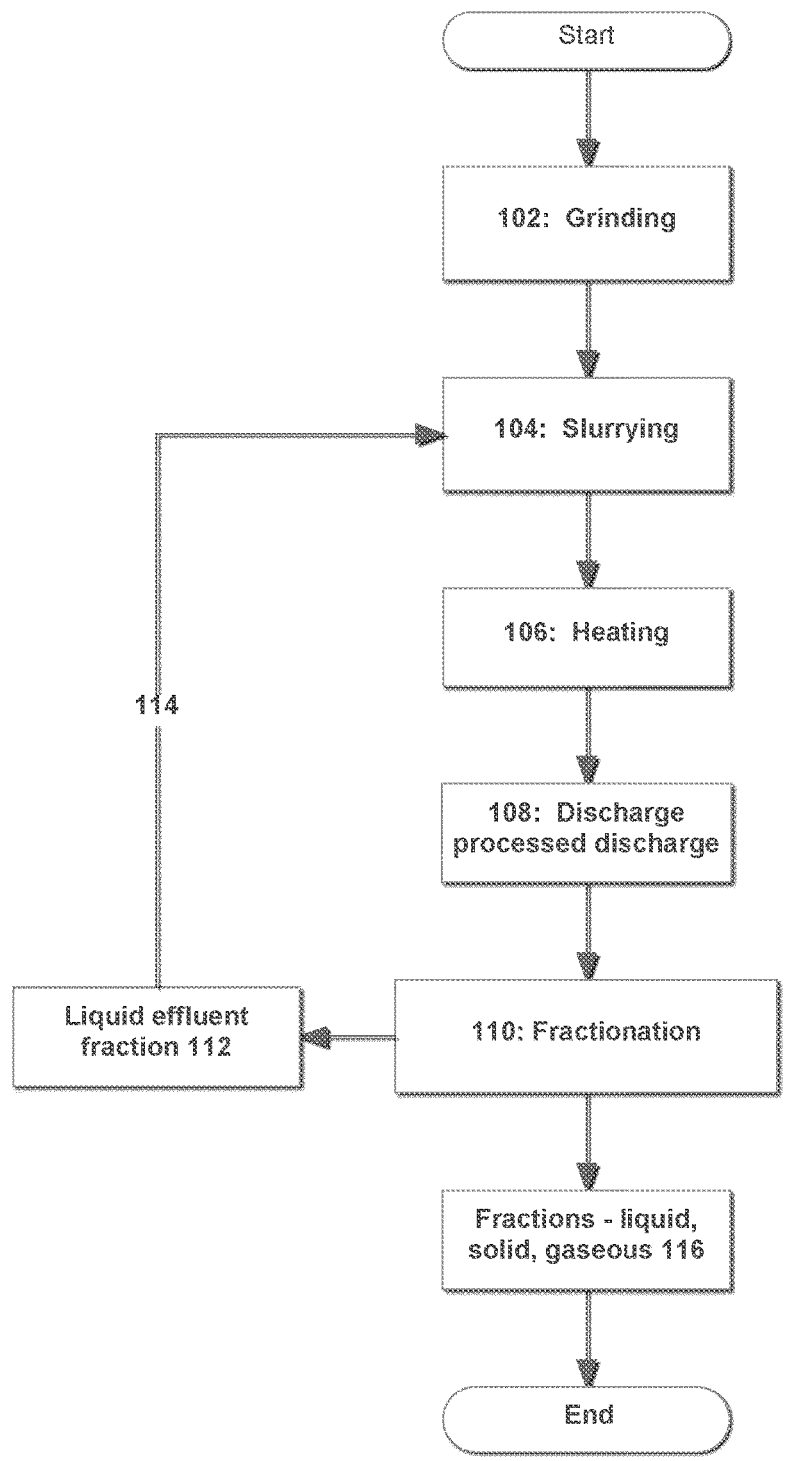
FIG. 1 is a flow chart demonstrating the steps of one embodiment of the method of extraction of multiple fractions from carbonaceous waste feedstock outlined.

Referring first to FIG. 1, there is shown a flowchart outlining the steps in one basic embodiment of the method of the present invention. The first step of the method of the present invention is a grinding step, in which the selected carbonaceous waste feedstock is ground into a ground feedstock of a selected particle size. This is shown at block 102 in the figure. Various types of grinding equipment could accomplish this step, depending upon the original format, phase or hardness for example of the carbonaceous waste feedstock, and the varying grinding equipment available or other equipment which can process a carbonaceous waste feedstock into a ground feedstock of a particular selected particle size will be understood to those skilled in the art and are all contemplated within the scope of the present invention.

With the ground feedstock of the selected particle size having been prepared, the next step in the method, shown at block 104, is a slurrying step. The slurrying step consists of the creation of a feedstock slurry by combining the ground feedstock with a slurry fluid as required, to yield a feedstock slurry of the desired consistency and moisture content. The desired consistency and moisture content could be determined case-by-case or may be dictated by other process parameters. Many combinations of equipment and method sub-steps which accomplish this objective of mixing those two components into a homogenous feedstock slurry for further processing are contemplated within the scope of the present invention.

Following the slurrying step 104, the next step in the method of the present invention is a heating step in which the feedstock slurry is subjected to a heating reaction by application of heat to a selected temperature at a fixed pressure and for a fixed period, to yield a processed discharge containing a liquid carbon-containing fraction and a gaseous fraction, shown at Step 106. Following the completion of the heating of the feedstock slurry at the selected pressure and selected temperature for the selected timeframe, the feedstock slurry is processed discharge, which is discharged from the processor for fractionation. The discharge of the processed discharge from the processor is shown at step 108.

Following the heating step 106 is a fractionation step in which the processed discharge recovered from the processor is separated into three fractions, being a liquid effluent fraction 114, liquid carbon-containing fraction, gaseous and solid fractions 116. Additional gas containing carbon dioxide might also be recovered during the fractionation step. Various types of methods and equipment can fractionate the processed discharge—fractionation of liquid processed discharge will be understood by those skilled in the art and it may include the use of centrifugal force, electroseparation or other types of processing to divide the processed discharge into the outlined fractions. The liquid effluent fraction 114, once recovered, is used in the slurrying step 104.

The liquid carbon-containing fraction recovered is economically viable hydrocarbon or oil that can be used in conventional hydrocarbon applications. In test runs of the method of the present invention outlined, viable hydrocarbons or oil including the following chemicals have been recovered:

| Name | Chemical formula |
| --- | --- |
| Furan, 2,5-dimethyl | C6H8O |
| Phenol | C6H6O |
| 1,3 Butadiene or 2,4-hexadiene | C6H10 |
| 1H-pyrazole, 1,3,5 trimethyl | C6H10N2 |
| Phenol, 4-methyl | C7H8O |
| Ethanone | C8H12O |
| Benzeneacetic acid, 4-hydro-3-methoxy | C9H10O4 |
| Decane | C10H22 |
| Undecanoic acid (fatty acids) | C11H20O2 |
| 2-propenol | C11H13NO |
| 1-Naphthalenone or | C12H14O |
| Tridecane | C13H28 |
| Tetradecane | C14H30 |
| Heneicosane | C15H32 |
| n-Hexadecanoic acid | C16H32O2 |
| Heptadecane | C17H36 |
| Ricinoleic acid | C18H34O3 |
| Octadecane | C18H38 |
| Octadecanoic acid, methyl ester | C18H38O2 |
| 9-octadecenoic acid, methyl ester | C19H36O2 |
| Eicosane | C20H42 |

-continued

| Name | Chemical formula |
| --- | --- |
| Retinal,9-cis | C20H28O |
| Retinol | C20H30O |
| Tetracosane | C21H44 |
| Hexanedioic acid, ester | C22H42O4 |

The identified chemicals could be processed or extracted/separated from the liquid fraction recovered. Methods of separation or extraction of these particular chemicals from the liquid fraction will be understood to those skilled in the art, and an extraction or cleaning step in respect of these chemicals will be understood to be within the scope of the present invention.

The recovered solid fraction would be useable for certain economical purposes. The solid fraction might include silica, which can be beneficial used in certain applications once cleaned. Processing the recovered solid fraction to recover clean silica is another variant on the overarching method of the present invention which is explicitly contemplated.

Figure 2:
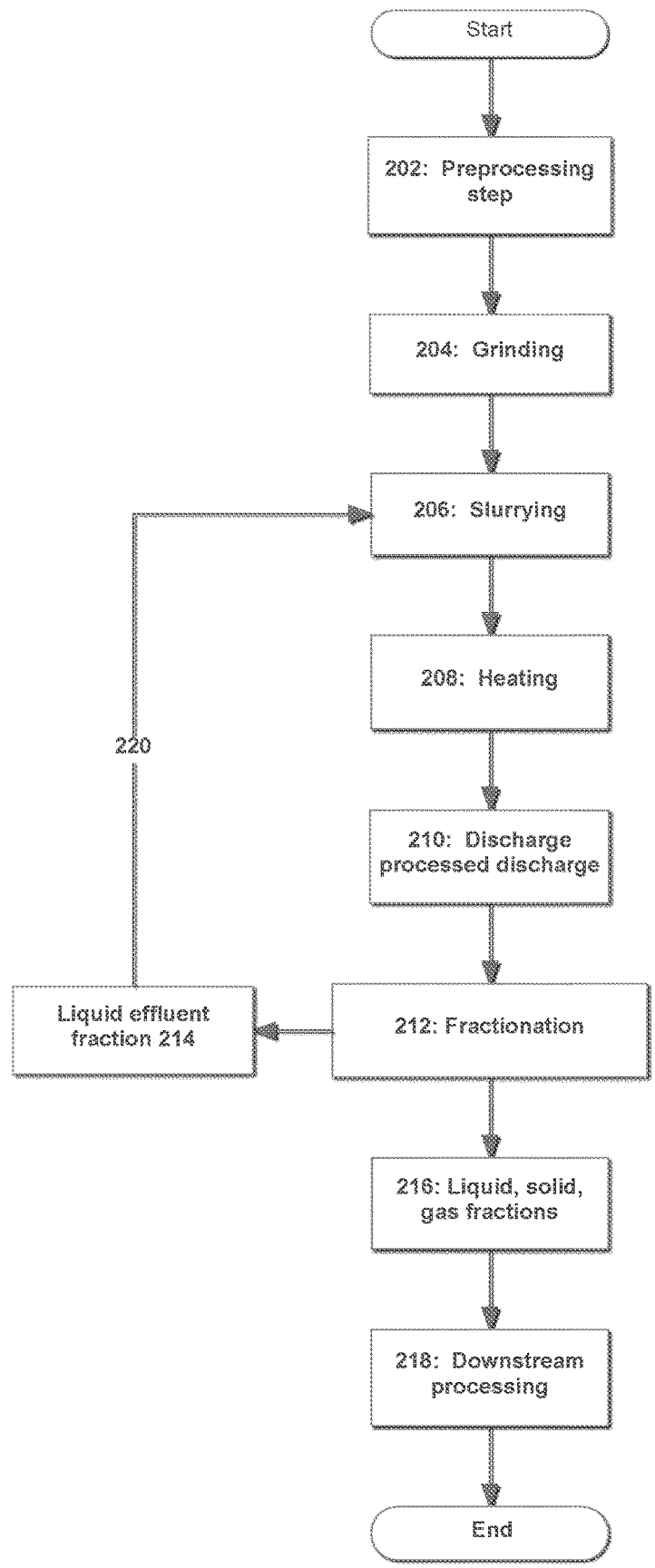
FIG. 2 is a flow chart demonstrating the steps of an alternate embodiment of the method of extraction of multiple fractions from carbonaceous waste feedstock outlined.

In FIG. 2 there is shown a flowchart demonstrating the steps of an alternate embodiment of the method of the present invention. At the beginning of the flowchart of FIG. 2, there is shown a pre-processing step 202. Pre-processing as outlined elsewhere herein might comprise the removal of undesirable components from the carbonaceous waste feedstock it was not desired to process further under the method of the present invention, or in certain other embodiments might also comprise the addition of components to the carbonaceous waste feed stream—for example if it was desired to add one or more ingredients or catalysts or the like to facilitate or enhance the heating reaction that eventually takes place in the heating step to maximize the efficiency and recovery of liquid carbon-containing fraction therefrom.

Following the pre-processing step, shown at 202, FIG. 2 shows the grinding step 204 which is the grinding of the feedstock into a ground feedstock of a selected particle size. Once the ground feedstock of a selected particle size has been prepared in grinding step 204, the slurrying step 206 can be completed. The slurrying step comprises the addition as required of slurry fluid, which is liquid effluent fraction recovered from previous operation of the method, to yield a feedstock slurry of the ground feedstock of a desired moisture content and consistency.

The heating step 208 consists of the injection or placement of the feedstock slurry into the processor, for applying heat to a selected temperature at a selective pressure and for a selected period. Following the completion of the heating step, the feedstock slurry is processed discharge. The processed discharge recovered at 210 is then separated into fractions in a fractionation step 212—yielding the liquid carbon-containing fraction, solid and gaseous fractions 216, done using many different separation equipment or separation methods.

The liquid effluent fraction 214 will likely comprise mostly water, and additional clean water could be added as required to the liquid effluent fraction 214 to have enough to continue slurrying additional ground feedstock. The recovered solid fraction is shown in this case to be delivered or otherwise handled for downstream processing at step 220. The downstream processing of the recovered fractions 220 could comprise limitless number of different processing steps or manufacturing steps to render useful products from the recovered fractions 216 or to verify its inert nature or its clean nature for disposal.

Various types of processors can be used within the scope of the method of the present invention. The key element of the method of the present invention is that the waste stream as slurried is processed in the processor at moisture levels over 50%, at pressures between 2000 and 4000 psi and temperatures between 250 to 450° C. These processing parameters in the processor result in the production of fractions containing hydrocarbons and other chemicals as outlined herein. Recovered carbon dioxide gas is a product by process is also contemplated to be within the scope of the patentable subject matter hereof.

Figure 3:
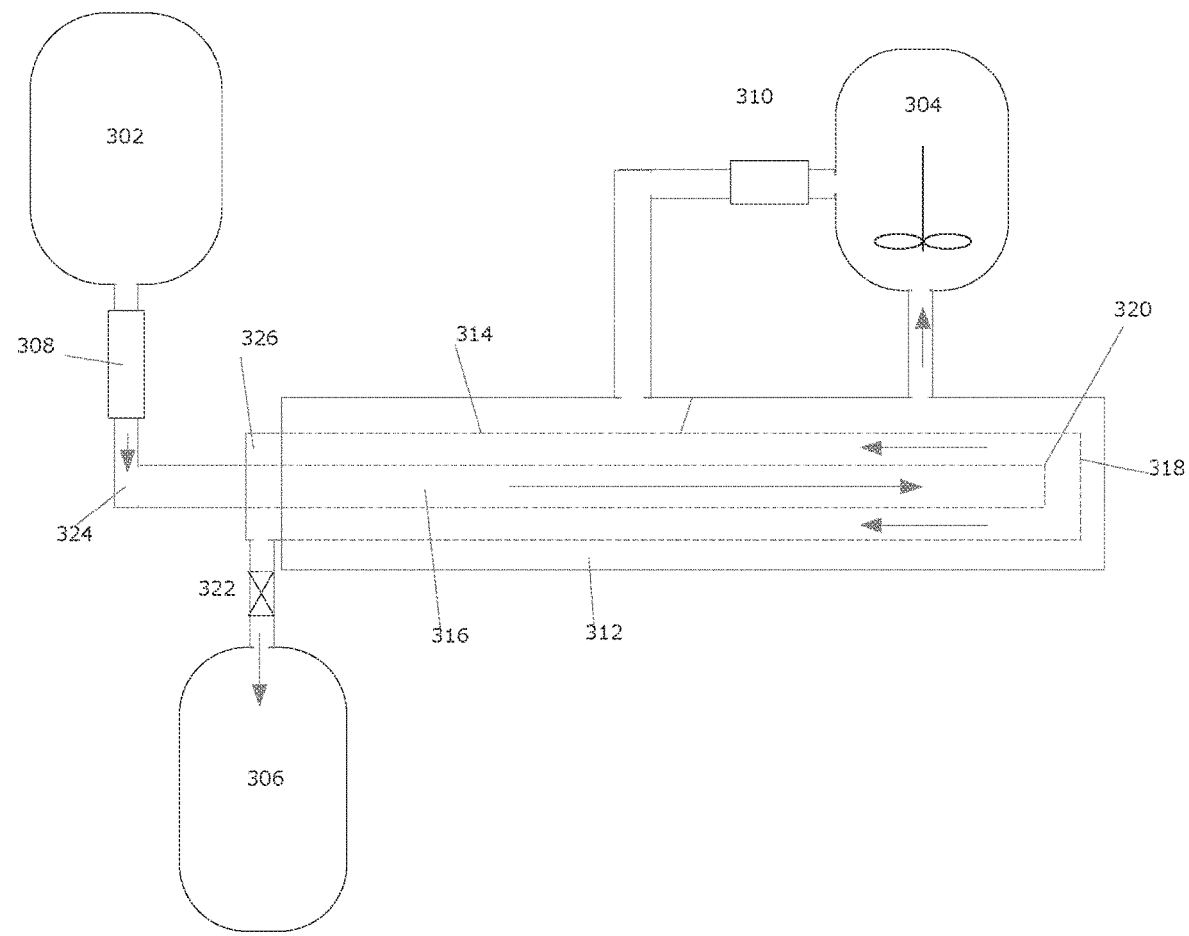
FIG. 3 is a schematic drawing of one processor system in accordance with the present invention.

The processor system disclosed in Canadian patent ser. No. 3011641 is one type of a reactor system that could be used in accordance with the method outlined herein and which is incorporated specifically herein by reference. FIG. 3 is a sample schematic of a processor which could be used to achieve the method and outcomes outlined herein. The processor first comprises in the embodiment shown a tube reactor, which results in the ability to apply heat to feedstock slurry enclosed for a fixed period and at a fixed pressure. The first component of the processor shown is an outer heating tube 314 with an outer tube length and an outer tube diameter with a closed outer distal end 318 and a discharge end 326. The second component of the processor besides the outer heating tube 314 is an inner heating tube 316 with an inner tube length and an inner tube diameter with an injection end 324 and an open inner distal end 320. The inner heating tube 316 is mounted axially inside of the outer heating tube 314 with the injection end 324 of the inner heating tube 314 being near the discharge end 326 of the outer heating tube 316, and the inner distal end 320 of the inner heating tube 316 is mounted inside of but near and in proximity to the inside of the outer distal end 318 of the outer heating tube 314.

The inner volume of the inner heating tube 316 comprises an inner heating reservoir 402. In the "out and back" of the processor design shown, the inner heating tube 316 is mounted within the outer heating tube 314 by the inner tube diameter 408 being less than the outer tube diameter 410—with the space between the inner heating tube 316 and the interior surface of the outer heating tube 314 being the outer heating reservoir.

The fluid path through these assembled tubes, as shown, once there is an injection of feedstock slurry via the injection end 324 of the inner heating tube 316 is along the inner heating tube 316 and upon exiting from the inner distal end 320 of the inner heating tube 316, the feedstock slurry would be pushed back along and inside of the outer heating reservoir within the outer heating tube 314 for an additional period of heating time, before its discharge via the discharge valve 322 at the discharge end 326 of the outer heating tube 314. The outer heating tube 314, near its discharge end 326, would enclose the inner heating tube 316 so the outer heating reservoir is defined so that fluid can be pressured within the outer heating reservoir for discharge via the discharge valve 322.

The pressure controlling injection means connected to the injection end 324 of the inner heating tube 316 in this embodiment constitutes an injection valve or pump 308, through which feedstock slurry can be injected into the inner heating reservoir defined by the inner heating tube 316. The discharge valve 322 when opened would allow for the discharge of processed discharge from the outer heating reservoir. The pressure controlling injection means and the pressure controlling discharge means, which as shown constitutes an injection valve and pump 308 and then a discharge valve 322, will be operated in cooperation to maintain the desired selective pressure of the feedstock slurry within the processor during the heating step 106. The injection valve 308, which in the embodiment shown incorporates a pump, is responsible for the pressurized injection of feedstock slurry into the inner heating tube 316 and the remainder of the processor. The injection valve or pump 308 can be controlled or actuated appropriately to introduce the feedstock slurry into the processor, and the injection valve 308 can also be operated with the discharge valve 322 to maintain the desired pressure level within the processor.

The direction of flow of the feedstock slurry through the injection valve 308 is also shown. The injection valve 308 again is explicitly contemplated in the embodiment shown to comprise a pump which could pump feedstock slurry from the source of feedstock slurry 302 up to pressure within the inner heating tube 316. If the source of feedstock slurry 302 were already pressurized at the appropriate operating pressure, then the injection valve 308 may have no pressure increasing means associated therewith and may simply comprise a valve similar to the discharge valve 322.

The final element of the processor in FIG. 3 is a heat source in operative communication with the outer heating reservoir defined by the outer heating tube 316, whereby heat can be applied to feedstock slurry within the processor. In the embodiment shown, the heat source comprises a fluid heat exchange jacket 312 in place around the outer heating tube 314, through which heating fluid can be circulated from a heating fluid reservoir 304 via a pump 310 or the like. Many types of heat sources could be contemplated but a fluid heat exchange jacket is well known in the design of processors and any a heat source which allows for safely applying heat to feedstock slurry within the processor is contemplated within the scope of the present invention. Electric heating tapes or other similar heating elements could also be used, mounted outside or within the processor reservoirs to apply heat to feedstock slurry.

In operation of the equipment in FIG. 3, the heating pump 310 would be actuated, to circulate heated heating fluid from the source of heating fluid 304 through the fluid heat exchange jacket 312. The heating fluid within the reservoir 304 could be maintained at the desired heating temperature for the feedstock slurry under the remainder of the method, or based upon additional controls and instrumentation, the heating fluid in the reservoir 304 could be maintained at a heat or temperature higher or lower than the desired eventual temperature to by application of the heat therefrom to feedstock slurry within the processor, accomplish the heating step of the method 106.

The injection valve or pump 308 would be actuated, to inject feedstock slurry into the inner heating tube 316. Upon injection of feedstock slurry via the injection end 324 of the inner heating tube 316, once the processor is pressurized by the injection of a full load of feedstock slurry into the entirety of both the inner and outer heating reservoirs, and the desired internal pressure within the processor is reached, the heating step 106 can be commenced. The heating step consists of the maintenance of the feedstock slurry within the inner and outer heating reservoirs for a selected period at a selected temperature and selected pressure, until the time had elapsed—the discharge valve 322 can then be actuated to allow for the discharge of the processed discharge from the processor. Additional piping can allow for the reprocessing of the first slug or batch of slurry to go through the system when started up and brought to temperature etc.—this will be understood to those skilled in the art and is beyond the scope of the broadest claims of the invention. As shown in this Figure the discharge valve 322 is operatively connected to a reservoir 306 into which the processed discharge can be captured for fractionation and completion of the method although as outlined elsewhere herein the fractionation step and the fractionation equipment might actually be connected directly via the discharge valve 322 as well so a reservoir 306 would be replaced directly with that equipment.

The most desirable operation of the processor outlined will be in a continuous feeding mode, where, dependent upon maintenance of the desired parameters for the heating step i.e. the desirable time for treatment of the slurry, the pressure within the vessel and the temperature itself, the discharge valve 322 and the injection valve or pump 308 can repeatedly be actuated to introduce additional slugs of feedstock slurry into the system and to simultaneously allow for the discharge of slugs of processed discharge via the discharge valve 322. The system and processor could also be operated in batch mode in certain embodiments, also considered within the scope of the present invention.

The path of travel of feedstock slurry through the inner heating tube 316 and back along the outer heating tube 314 eventually through the injection valve 322 into the processed discharge reservoir 306 is shown by additional flow arrows on the diagram. The flow of the heating fluid from the source of heating fluid 304, via the heating pump 310 through the fluid heat exchange jacket 312 is shown as well by two fluid direction arrows in the conduits associated therewith.

As outlined elsewhere herein the preprocessing step might also include either besides the removal of certain components or in the place of removal of certain components, adding one or more ingredients to the carbonaceous waste feedstock before grinding—for example when a particular chemical agent or the like had to be added to optimize the heating reaction or otherwise again results in the most efficient or efficacious operation of the system and method of the present invention. Again, the addition of any particular added ingredient to the carbonaceous waste feedstock in the preprocessing step before the grinding is contemplated within the scope of the present invention, regardless of the ingredient or ingredients to be added.

The slurry fluid might be many different fluids including water. We specifically assume however under the remainder of the method outlined that beyond initially "priming" the process with clean slurry fluid, quantities of recovered liquid effluent fraction 114 from execution of the method of the present invention will be the slurry fluid used to constitute the feedstock slurry. The desired characteristics of the feedstock slurry could vary, either based upon the handling characteristics desired i.e. to make the slurry flowable in a particular way, drier or wetter, or the like, or the desired characteristics of the feedstock slurry might also be affected by the desired profile for the feedstock slurry to maximize the efficiency of the heating reaction within the heating step and the transfer reactor.

FIG. 3 shows an emulsion discharge holding tank 306 being a holding tank connected to the processor outside of the pressure-controlling discharge means or discharge valve 322. The emulsion discharge holding tank 306 as shown would hold the discharged processed discharge and the processed discharge could then be separated in the fractionation step 110. Many technical approaches could be taken to the fractionation of the processed discharge. The processed discharge could be separated into the desired fractions mechanically, using different novel or known mechanical fractionation equipment or technologies, or different chemical or even electrical fractionation technologies could be used in certain circumstances to divide or refine the processed discharge into the separated liquid, solid, gas fractions desired. The liquid effluent fraction 114 is explicitly contemplated to primarily constitute water. Beyond using clean water to prime the system on startup, we assume the water used, and recovered as liquid effluent fraction 114, will be reused to prepare additional feedstock slurry in the method. Reuse of the water, or the liquid effluent fraction 114, in the subsequent slurrying of additional ground feedstock is a key element of the present invention.

An emulsion discharge holding tank 306 is shown in the Figures herein, but the processed discharge when discharged from the processor via the discharge valve 322 could also be discharged straight into equipment related to the fractionation step rather than into a discharge holding tank as shown. Both such approaches are contemplated within the scope of the present invention. Any fractionation process which will cause the separation of the discharged processed discharge into the desired fractions is contemplated within the scope.

The equipment used in the fractionation step is not shown but will be understood to those skilled in the art of fluid or chemical processing and any combination of fractionation equipment or processes which could separate the recovered processed discharge into the three desired fractions—liquid effluent fraction, recovered solid fraction and liquid carbon-containing fraction—and any fractionation processes or steps which could conduct this separation are contemplated within the scope of the present invention.

The following specific recovered fractions are contemplated within the scope of the present invention as products of the process and method outlined herein, regardless of the type of processor used in the method: biogas, biofuels, biosolids and bio crude. Other liquid phase fractions might include any of the following chemicals, dependent upon the waste stream or feedstock used: Furan, 2,5-dimethyl; Phenol; 1,3 Butadiene; 2,4-hexadiene; 1H-pyrazole, 1,3,5 trimethyl; Phenol,4-methyl; Ethanone; Benzeneacetic acid, 4-hydro-3-methoxy; Decane; Undecanoic acid (fatty acids); 2-propenol; 1-Naphthalenone; Tridecane; Tetradecane; Heneicosane; n-Hexadecanoic acid; Heptadecane; Ricinoleic acid; octadecane; Octadecanoic acid, methyl ester; 9-octadecenoic acid, methyl ester; Eicosane; Retinal,9-cis; Retinol; Tetracosane; or Hexanedioic acid, ester.

Solid fractions are also contemplated to potentially be recovered which are economically viable and as further products of the process of the present invention are also intended to be covered by this disclosure—these include silica, phosphates, potash, or even low concentration of nitrogen which could be used for fertilizer purposes or the like. Off gassing from the process might also yield carbon dioxide of a high grade or concentration which would have commercial utility in which is again contemplated within the scope of the present invention.

The recovered liquid carbon-containing fraction, liquid effluent fraction, gaseous fraction or recovered solid fraction could each be subjected to further downstream processing or handling following the fractionation step of the method of the present invention. The details of the downstream processing of the recovered fractions from the processed discharge are not shown in the Figures.

Figure 4:
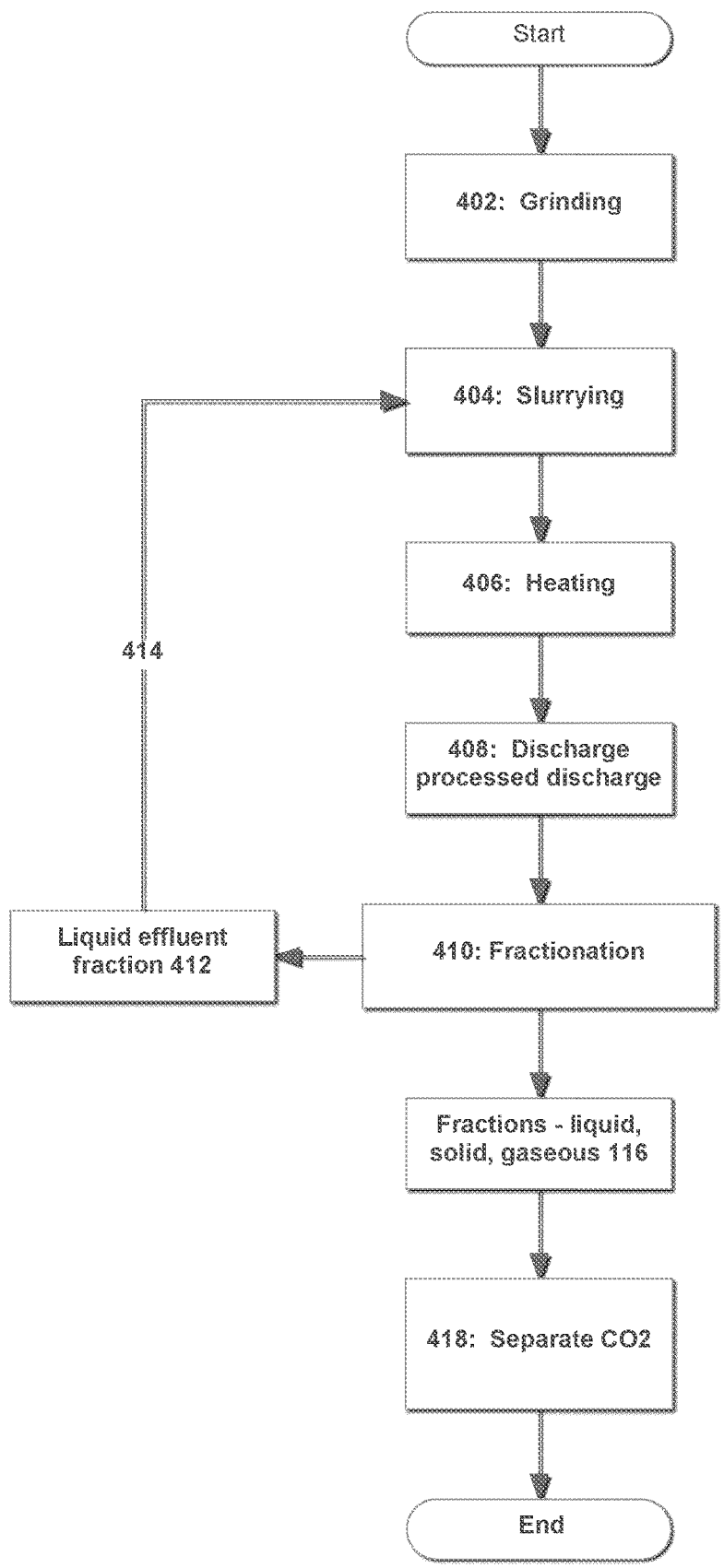
FIG. 4 is a flow chart demonstrating the steps of one embodiment of the method of extraction of gaseous carbon dioxide from carbonaceous waste feedstock in accordance with the method outlined.

FIG. 4 is a flowchart demonstrating the steps involved in one embodiment of a method in accordance with the present invention, in which gaseous carbon dioxide would be recovered from the hydrothermic liquefaction processing method of the present invention. The majority of the steps of FIG. 4 are the same as the method of FIG. 1 outlined herein, with the exception of the addition of the separation step 418 following the fractionation step 410—in which carbon dioxide would be separated or recovered from the gaseous fraction 116 recovered in the fractionation step. The recovered carbon dioxide could be further processed or used for commercial purposes, or if it was not of sufficient quantity or quality it could also be stored or sequestered to maintain its safe isolation.

Figure 5:
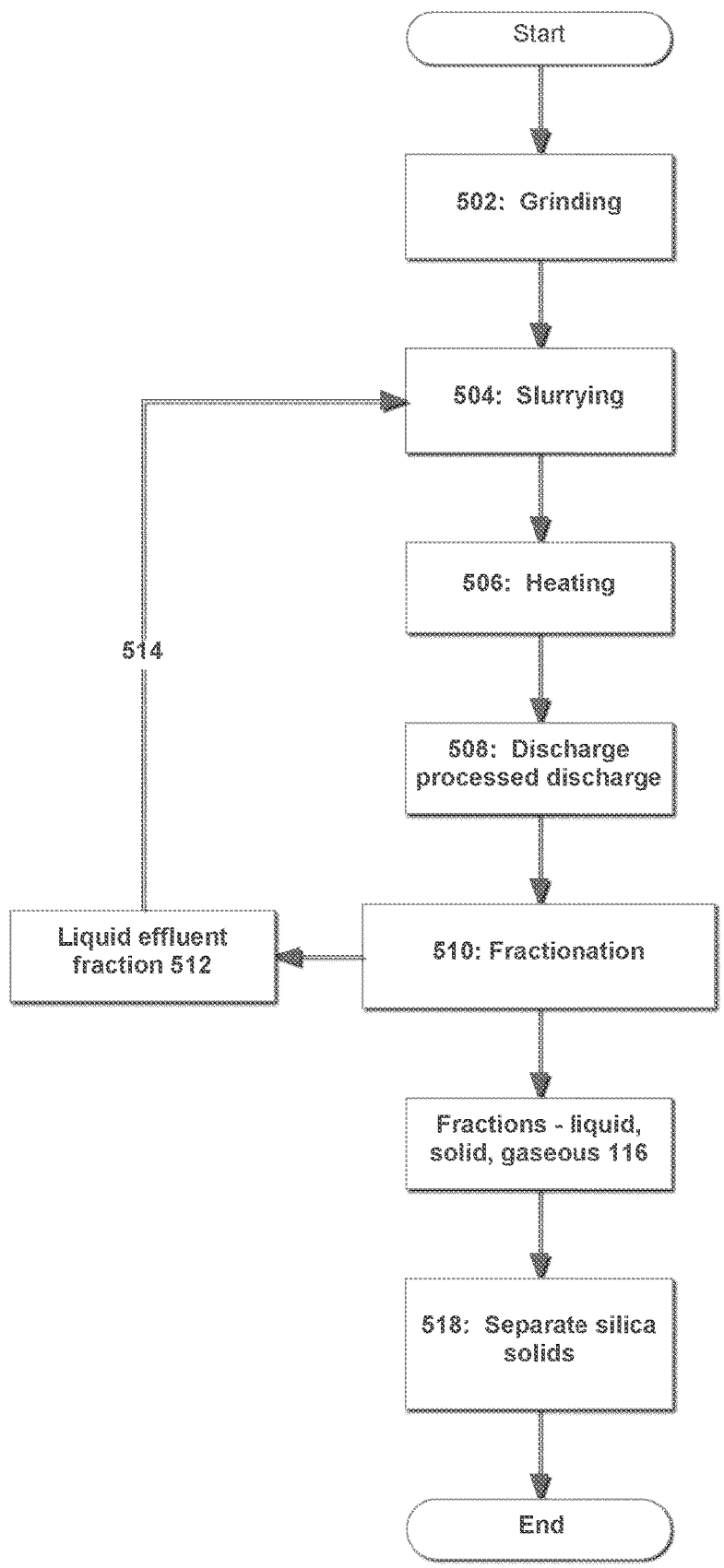
FIG. 5 is a flow chart demonstrating the steps of one embodiment of the method of extraction of silica solids from carbonaceous waste feedstock and solid fractions recovered therefrom, in accordance with the remainder of the method outlined.

FIG. 5 is a flowchart demonstrating the steps involved in one embodiment of the method in accordance with the present invention in which silica solids could be recovered from the solid fraction recovered from the reaction and liquefaction performed. The majority of the steps of FIG. 5 are the same as those of FIG. 1, with the exception of the addition of the separation step 518 following the fractionation step 510—in which silica solids are isolated, cleaned or recovered from the solid fraction 116 and can again be used for commercial purposes.

Figure 6:
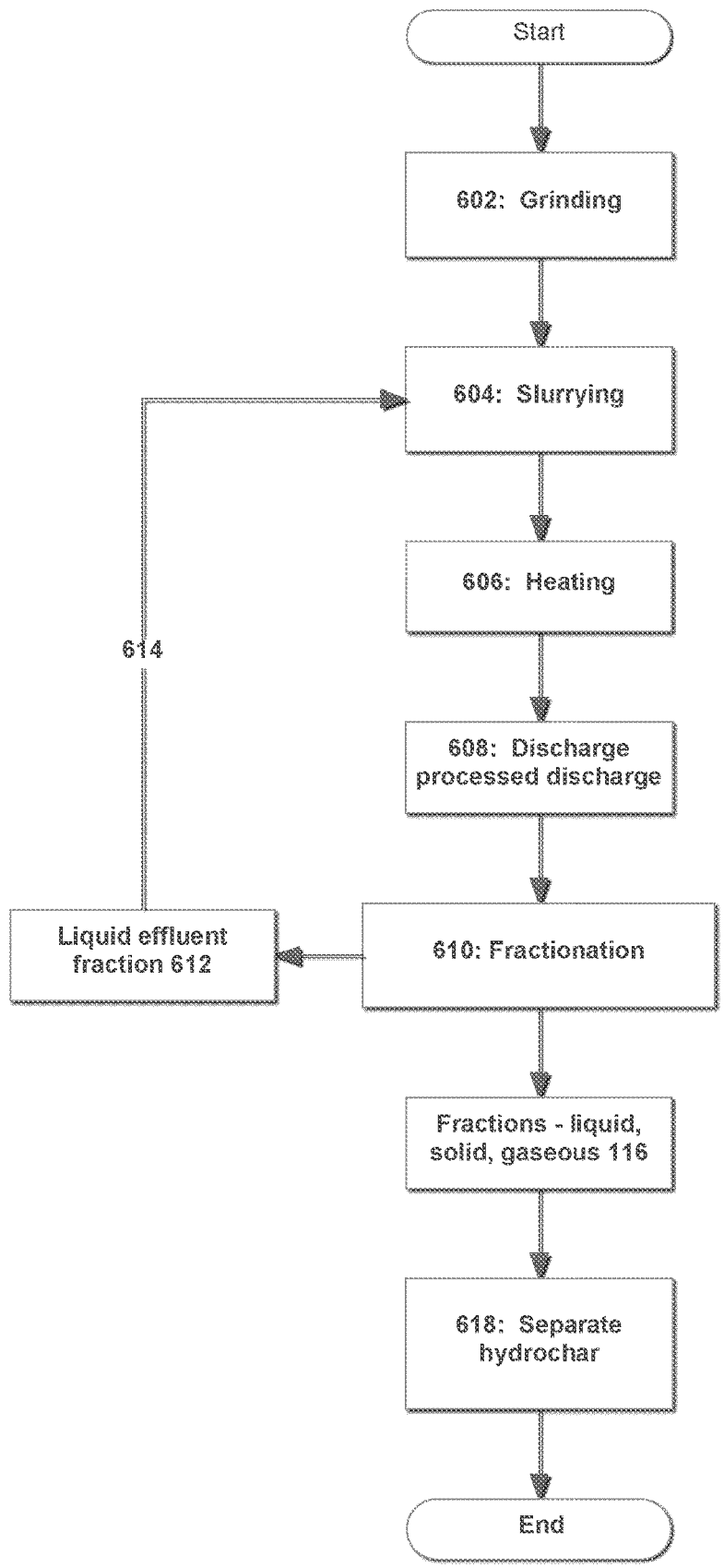
FIG. 6 is a flow chart demonstrating steps of one embodiment of a method of extraction of hydrochar solids and carbonaceous waste feedstock and solid fractions recovered therefrom, in accordance with the method outlined.

FIG. 6 is a flowchart demonstrating the steps involved in one embodiment of the method of the present invention which hydrochar is recovered from the solid fraction recovered from the reaction and liquefaction performed. The majority of the steps of FIG. 6 are the same as those of FIG. 1 in the narrative outlined above in association with, with the exception of the addition of the separation step 618 following the fractionation step 610—in which hydrochar is isolated, cleaned or recovered from the solid fraction 116 and can be used for commercial purposes. Hydrochar would be a particularly high value component recovered.

As outlined in the claims, it is also intended that the products, carbon dioxide, silica solids and hydrochar, extracted and recovered in accordance with the methods outlined herein are also encompassed by the claims and the scope of the present invention.

It will be apparent to those of skill in the art that by routine modification the present invention can be optimized for a wide range of conditions and applications. It will also be obvious to those of skill in the art there are various ways and designs with which to produce the apparatus and methods of the present invention. The illustrated embodiments are therefore not intended to limit the invention, but to provide examples of the apparatus and method to enable those of skill in the art to appreciate the inventive concept.

Those skilled in the art will recognize that many more modifications besides those already described are possible without departing from the inventive concepts herein. The inventive subject, therefore, is not to be restricted except in the appended claims. In interpreting both the specification and the claims, all terms should be interpreted in the broadest possible manner consistent with the context. The terms "comprise" and "comprising" should be interpreted as referring to elements, components, or steps in a non-exclusive manner, indicating that the referenced elements, components, or steps may be present, or utilized, or combined with other elements, components, or steps not expressly referenced.

What is claimed is:

1. A method of extraction of at least one carbon-containing fraction from carbonaceous waste feedstock, the method comprising:
   in a slurrying step, combining prepared feedstock with a slurry fluid as required to yield a feedstock slurry of a desired consistency and moisture content;
   in a heating step, placing the feedstock slurry into a processor and heating the feedstock slurry to a selected temperature for a selected period of heating time while maintaining a selected pressure within the processor, following completion of which the feedstock slurry is processed discharge which is discharged from the processor;

in a fractionation step, separating the processed discharge into four fractions including a carbonaceous liquid fraction, a liquid effluent fraction, a gaseous fraction, and a solid fraction, wherein the solid fraction contains hydrochar; and following the fractionation step, separating the hydrochar from the solid fraction for commercial use;

wherein:

the heating step is conducted in a batch or continuous feeding mode;

wherein the gaseous fraction contains carbon dioxide; and wherein the liquid effluent fraction is primarily water, recovered from previous operation of the method.

2. The method according to claim 1, wherein the carbonaceous waste feedstock is solid and the method further comprises a grinding step in advance of the slurrying step, wherein the carbonaceous waste feedstock is ground into prepared feedstock of a selected particle size.

3. The method according to claim 1, wherein the solid fraction contains silica.

4. The method according to claim 3, further comprising, following the fractionation step, separating the silica from the recovered solid fraction for commercial use.

5. The method according to claim 1, further comprising, following the fractionation step, separating the carbon dioxide from the gaseous fraction for commercial use.

6. The method according to claim 1, wherein the carbonaceous liquid fraction is a liquid hydrocarbon.

7. The method according to claim 1, further comprising an aqueous extraction step following the fractionation step wherein at least one aqueous chemical is extracted from the liquid carbon-containing fraction, said at least one aqueous chemical selected from the group of: Furan, 2,5-dimethyl; Phenol; 1,3 Butadiene; 2,4-hexadiene; 1H-pyrazole, 1,3,5 trimethyl; Phenol,4-methyl; Ethanone; Benzeneacetic acid, 4-hydro-3-methoxy; Decane; Undecanoic acid (fatty acids); 2-propenol; 1-Naphthalenone; Tridecane; Tetradecane; Heneicosane; n-Hexadecanoic acid; Heptadecane; Ricinoleic acid; octadecane; Octadecanoic acid, methyl ester; 9-octadecenoic acid, methyl ester; Eicosane; Retinal,9-cis; Retinol; Tetracosane; or Hexanedioic acid, ester.

8. The method according to claim 1, further comprising a pre-processing step in advance of the slurrying step comprising removing untreatable items from the carbonaceous waste feedstock selected from the group including metals, rocks, glass, and nontreatable waste.

9. A method of extraction of hydrochar from carbonaceous waste feedstock, the method comprising:

in a slurrying step, creating a feedstock slurry by combining prepared feedstock with a slurry fluid as required to yield a feedstock slurry of a desired consistency and moisture content;

in a heating step, placing the feedstock slurry into a processor and heating the feedstock slurry to a selected temperature for a selected period of heating time while maintaining a selected pressure within the processor, following completion of which the feedstock slurry is processed discharge which is discharged from the processor;

in a fractionation step, separating the processed discharge into at least three fractions being a liquid carbon-containing fraction, a gaseous fraction containing carbon dioxide, and a solid fraction; and in a separation step, separating hydrochar solids from the solid fraction for commercial use;

wherein:

the heating step is conducted in either a batch or continuous feeding mode; and the liquid effluent fraction is primarily water, recovered from previous operation of the method.

10. The method according to claim 9, wherein the selected pressure is in the range of 2000 psi to 4000 psi.

11. The method according to claim 9, wherein the selected temperature is in the range of 275 degrees Celsius to 425 degrees Celsius.

12. The method according to claim 9, wherein the processor comprises a tube reactor with an intake and a discharge, and a heating fluid jacket around at least a portion thereof to heat the contents of the tube reactor, wherein a heating fluid circulated therethrough will transfer heat to the tube reactor and to the feedstock slurry within the processor.

* * * * *